United States Patent [19]
Heyring

[11] Patent Number: 5,447,332
[45] Date of Patent: Sep. 5, 1995

[54] VEHICLE SUSPENSION SYSTEM

[75] Inventor: Christopher B. Heyring, Dunsborough, Australia

[73] Assignee: Kinetic Limited, Dunsborough, Australia

[21] Appl. No.: 178,249

[22] PCT Filed: Jul. 16, 1992

[86] PCT No.: PCT/AU92/00362
§ 371 Date: Jan. 10, 1994
§ 102(e) Date: Jan. 10, 1994

[87] PCT Pub. No.: WO93/01948
PCT Pub. Date: Feb. 4, 1993

[30] Foreign Application Priority Data
Jul. 16, 1991 [AU] Australia ............... PK7255
Dec. 18, 1991 [AU] Australia ............... PL0085

[51] Int. Cl.⁶ .................................. B60G 21/06
[52] U.S. Cl. ........................... 280/772; 280/703; 280/714
[58] Field of Search ............ 280/772, 689, 703, 714, 280/6.11, DIG. 1

[56] References Cited
U.S. PATENT DOCUMENTS
3,752,497  8/1973  Enke et al. ............... 280/112.2
4,606,551  8/1986  Toti et al. ................. 280/772
4,872,701 10/1989  Akatsu et al. ............. 280/703

FOREIGN PATENT DOCUMENTS
  33881  8/1969  Australia .
1535641  7/1968  France .
2135633  2/1973  Germany .
2182529  7/1990  Japan .
 363811 12/1931  United Kingdom .
 670361  4/1952  United Kingdom .
 820194  9/1959  United Kingdom .
1488254 10/1977  United Kingdom .
2009062  6/1979  United Kingdom .

Primary Examiner—Kenneth R. Rice
Attorney, Agent, or Firm—Willian Brinks Hofer Gilson & Lione

[57] ABSTRACT

A vehicle having a suspension comprising a double acting ram (13, 14, 17, 18) connecting each wheel (1, 2, 3, 4) independently to the body (5) of the vehicle, each ram (13, 14, 17, 18) having respective first (13a, 14a, 17a, 18a) and second (13b, 14b, 17b, 18b) chambers that vary in volume as the wheels move relative to the vehicle body (5). Each front wheel ram (13, 18) is connected to the diagonally opposite rear wheel ram (14, 17) by a respective pair of conduits (8, 10) and (8a, 10a) arranged so the first chamber (13a, 18a) of one wheel is connected to the second chamber (14b, 17b) of the other wheel. Each first and second chamber and the conduits connected thereto are filled with fluid and independent of external fluid and pressure sources. Diagonal interconnection of the front and rear rams minimizes roll movement in a lateral direction and pitch movement in the longitudinal direction of the vehicle.

13 Claims, 3 Drawing Sheets

VEHICLE SUSPENSION SYSTEM

This invention relates to a suspension system for a vehicle, and is specifically related to controlling the movement of the wheels relative to the vehicle body when turning at speed and traversing uneven surfaces.

In known suspension systems resilient means such as springs or torsion bars are provided to perform a multiplicity of functions ranging from the absorption of impact loading (as from hitting bumps at speed) to the provision of flexible support to enable all the wheels to maintain ground contact when traversing uneven terrain. Additionally applied loads such as cargo deflects traditional suspensions to induce movement between the body and wheels in a similar manner to dynamic or contour loadings.

Traditional resiliently sprung suspensions are based on each wheel assembly being provided with an individual resilient component which mechanically supports the respective "corners" of the vehicle. The resilient components have rapidly progressive lead rating as deflected and normal vehicle weight is only distributed to all wheels when the wheels collectively describe a flat plane surface. When one wheel of a vehicle passes over (or is parked on) a bump, that wheel carries more vehicular weight than it normally carries on flat ground. Meanwhile the other wheels are correspondingly relieved of some of their normal share of the weight.

The rapidly progressive resiliently sprung suspension systems work satisfactorily only within a very narrow spectrum of dynamic, static and applied loading situations, and any type of overloading or even underloading of a vehicle normally adversely affects its abilities to maintain traction, average ground clearance, and quality of ride. Moreover the scope of demands upon known resilient suspension systems leads to self conflicting performance characteristics as there is no inherent ability in the system to detect and react differently to diverse situations, which cause resonant rebounding, requiring excessive damping with shock absorbers, and also anti-roll bars, thus limiting free movement of unsprung components.

Recently there has been a trend towards resilient sprung suspension systems incorporating variable damping and spring rates in an attempt to redress some of the above referred to shortcomings. Some other more advanced suspension systems (active and semi-active suspensions) incorporate a number of electronic sensors which monitor information such as vertical wheel travel and body roll, as well as speed, acceleration steering and braking commands. This and other data is processed by a computer which instructs hydraulic actuators to override the normal function of resilient springs in order to interpret, compensate and adjust the suspensions performance to suit speed, terrain and other factors in order to maintain a level ride and even distribution of weight onto the wheels: These suspension systems therefore require an external intelligent back-up system, and call for a substantial input of external energy, drawn from the vehicle engine, to operate the actuators that effect the adjustment to the suspension system.

A range of constructions of active and semi-active suspensions for vehicles have been proposed including systems operating on the basis of compression and/or displacement of fluids and such systems currently in use incorporate a pump to maintain the working fluid at the required pressure and effect distribution thereof, and sophisticated control mechanisms to regulate the operation of the suspension system in accordance with sensed road and/or vehicle operating conditions. These known systems incorporating pumps and electronic control systems, are comparatively expensive to construct and maintain, and require energy input, and therefore have limited acceptability in the vehicle industry.

There has been proposed, such as in U.S. Pat. No. 4,606,551, damping systems used in conjunction with conventional sprung suspensions wherein fluid damping devices associated with individual wheels are interconnected to provide additional damping action during lateral rolling or longitudinal pitching movements. Although these constructions may contribute to improved damping performance the undesirable characteristics of the basic sprung suspension, of rapidly progressive change in spring forces, lead to undesirable changes in weight distribution and limited wheel movements are still present.

It is therefore the object of the present invention to provide a suspension system which eliminates the use of conventional spring components and incorporates a totally fluid suspension without the need for controlled external energy imput during operation and provides unrestricted wheel movement while minimising roll and pitch motion, and is of relative simpler construction and effective in operation.

With this object in view, there is provided by the present invention a vehicle having a load support body, and a pair of front ground engaging wheels and a pair of rear ground engaging wheels connected to the body to support same and each wheel being displaceable relative to the body in a generally vertical direction, a double acting fluid ram interconnected between each wheel and the body each ram including first and second fluid filled chambers on opposite sides of a ram piston, said first and second chambers varying in volume in response to vertical movement between the respective wheel and the body, each front wheel ram being connected to the diagonally opposite rear wheel ram by a respective pair of fluid communicating conduits, a first one of said pair of conduits connecting the first chamber of the front wheel ram to the second chamber of the rear wheel ram and the second one of said pair of conduits connecting the second chamber of the front wheel ram to the first chamber of the rear wheel ram, each pair of conduits and the front and rear wheel rams interconnected thereby constituting a respective circuit, means operably interposed between the two fluid circuits and adapted to substantially equalise the pressure in the two circuits and thereby substantially equalising the loading on each wheel and each said circuit incorporating resilience to accommodate fluid displaced from rams in that circuit by a resultant pressure change, each said circuit in operation being independent of, external fluid and pressure sources, and said circuits together minimising roll movement in a lateral direction and pitch movement in the longitudinal direction of the body.

The interaction of the interconnected pairs of diagonally opposite rams of the vehicle by virtue of the independent fluid circuits provides a control over the lateral roll of the vehicle body, as normally encountered when the vehicle is turning, particularly at speed and also over fore or aft longitudinal pitch encountered during braking or acceleration of the vehicle.

The transference of the fluid medium at balancing pressures between the rams of the diagonally connected front and rear wheels effects levelling and stabilisation of the vehicle body by the extension and retraction of the appropriate rams which provide the changing adjustable support mechanism of the vehicle body with reference to the unsprung wheel assemblies.

The provision of the fluid circuits interconnecting the rams of the diagonally opposite wheels as above described results in the condition whereby when any one wheel is subjected to a load attempting to move that wheel in one direction relative to the body the diagonally opposite wheel attempts to move in the same direction. In operating conditions that would induce body roll or pitch in a vehicle, whereby an increase in load, on the two front or two rear wheels in the case of pitch, or on one front and one rear wheel on the same side of the vehicle in the case of roll, the presently proposed construction will inhibit pitch or roll due to the diagonally opposite wheels being control-led to prevent movement in the opposite direction, and limit movements in the same direction.

In order to at least partially accommodate the displacement of fluid from the rams incorporated in each circuit, there is preferably provided at least one pressure accumulator in each fluid circuit. More specifically there is preferably at least one pressure accumulator in each conduit connecting the chambers of the diagonally opposite rams of the vehicle. The accumulators provide resilience in the suspension system as springs do in conventional vehicle suspensions.

In an embodiment of the suspension where the fluid is compressible, such as a gas, accumulators are not required as the medium is in itself an accumulator.

More specifically said means operably interposed between said circuits comprise two closed chambers each divided into two minor chambers by a respective piston, said pistons being interconnected to move in unison in the respective closed chambers. The minor chambers on the same side of the respective pistons being connected respectively to the first and second conduits of one of said circuits and the minor chambers on the opposite side of the respective pistons being connected respectively to the first and second conduits of the other of said circuits, whereby in use the pistons will take up a position in the respective closed chambers to equalise the pressure in the two circuits. This construction thereby provides substantial equal loading on all the four wheels.

When the vehicle is travelling on normal roadways wheel movements relative to the body are small, normally of high frequency, and are accommodated by the displacement of fluid passing into an accumulator in the connected circuit with little if any transfer of fluid between ram chambers, with a resultant change in the pressure in that circuit.

However when the vehicle is off normal roadways and/or when pitch or roll creating conditions exist, larger and relative low frequency wheel movements are experienced. These are initially accommodated by some fluid passing to the accumulator, with a resultant pressure rise in the circuit and some passing to other ram chambers in the circuit to induce compensating movement of the other wheel controlled by that circuit. Within a small interval of time a new stable conditions in respect to the vertical position of the wheels relative to the body is established so that the vehicle body assumes a generally horizontal or generally parallel to the overall inclination of the terrain being transversed.

Unlike other suspension systems, roll and pitch minimisation and the re-establishment of body level is achieved in the .presently proposed construction without the input of energy to the suspension system, drawn from a pump, compressor or otherwise from an engine or an external power source, and without the requirement of pressure transducers and other performance monitoring devices feeding information to one or more ECUs which in turn may control electrical actuated solenoid valves, pumps, compressors or the controlled release of pressurised fluid from accumulators.

The vehicle suspension above described differs from known systems in that the wheel travel is not controlled entirely by progressive resilient suspension mechanisms and all wheels can freely follow even extremely uneven-terrain. The interaction of the pressure and volume changes in the fluid circuits maintaining a substantially average vehicle body height and atitude, without unduly limiting the permissible extent of wheel travel movements. Furthermore there is an unprecedented working interrelationship between the diagonal opposite wheels which are directly interconnected to each other by the individual fluid circuits, which is collectively applied to the vehicle body so that conventional resilient components, such as spring, are not required in the suspension system. If springs are provided they can only be arranged to absorb and dampen dynamic shock, and can not inhibit the translation of wheel movement induced by uneven roads or terrain.

A vehicle supported on wheels in the above described manner allows free vertical travel of the wheels with respect to the vehicle body without having to first overcome the resistance of the conventional spring mechanisms normally incorporated between the wheels and the vehicle-body. Thus, the wheels are free to move to follow the undulations of the surface being travelled-without continually changing the vehicle weight distribution between the individual wheels. This substantial elimination of changes in weight distribution significantly improves the traction of the wheels to the surface being transversed and the handling characteristics of the vehicle.

Several practical applications of the present invention will now be described by-way of examples with reference to the accompanying drawings.

In the drawings

Figure 1:
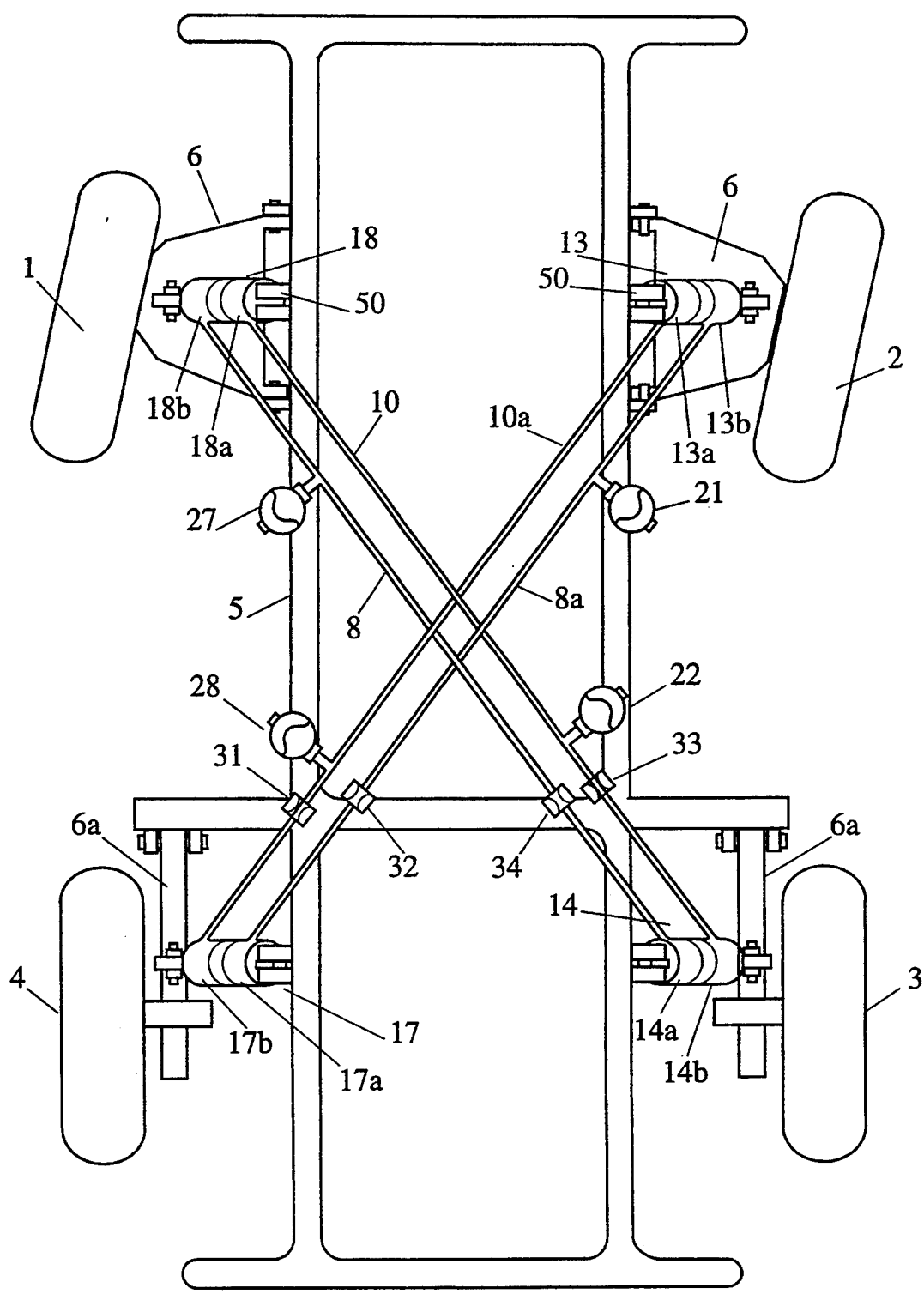
FIG. 1 is a diagrammatic layout of a vehicle chassis and wheel assembly incorporating the proposed suspension system.

Referring now to FIG. 1 of the drawings, the vehicle chassis 5, is supported by four wheels 1 to 4 respectively through parallel wishbone type linkage 6, for front wheels 1 and 2 and trailing arms 6a for rear wheels 3 and 4, the construction of each being well known. Other known forms of linkage for connecting vehicle wheels to a chassis could be used if preferred. It is however to be noted that no springs, torsion bars, roll or stabiliser bars or other resilient mechanical suspension elements are necessary between the chassis and the respective wheels.

A respective double acting ram is interconnected between the chassis 5 and the linkages 6 and 6a connecting each wheel to the chassis. The front and rear rams on the left side in FIG. 1 are numbered 18 and 17 respectively and on the right side 14 and 13 respectively. Each of the rams have a cylinder coupled as at 50 to the chassis 5 and a piston therein dividing the cylinder into two chambers indicated as 17a and 17b in respect of cylinder 17 and 18a and 18b in respect of ram 18. The other two cylinders 13 and 14 are of the same construction and similarly identified. The piston of each ram is connected to the respective wheel through the linkage 6 so the piston will reciprocate in the cylinder as the wheel is moved in the general vertical direction relative to the chassis 5.

Figure 2:
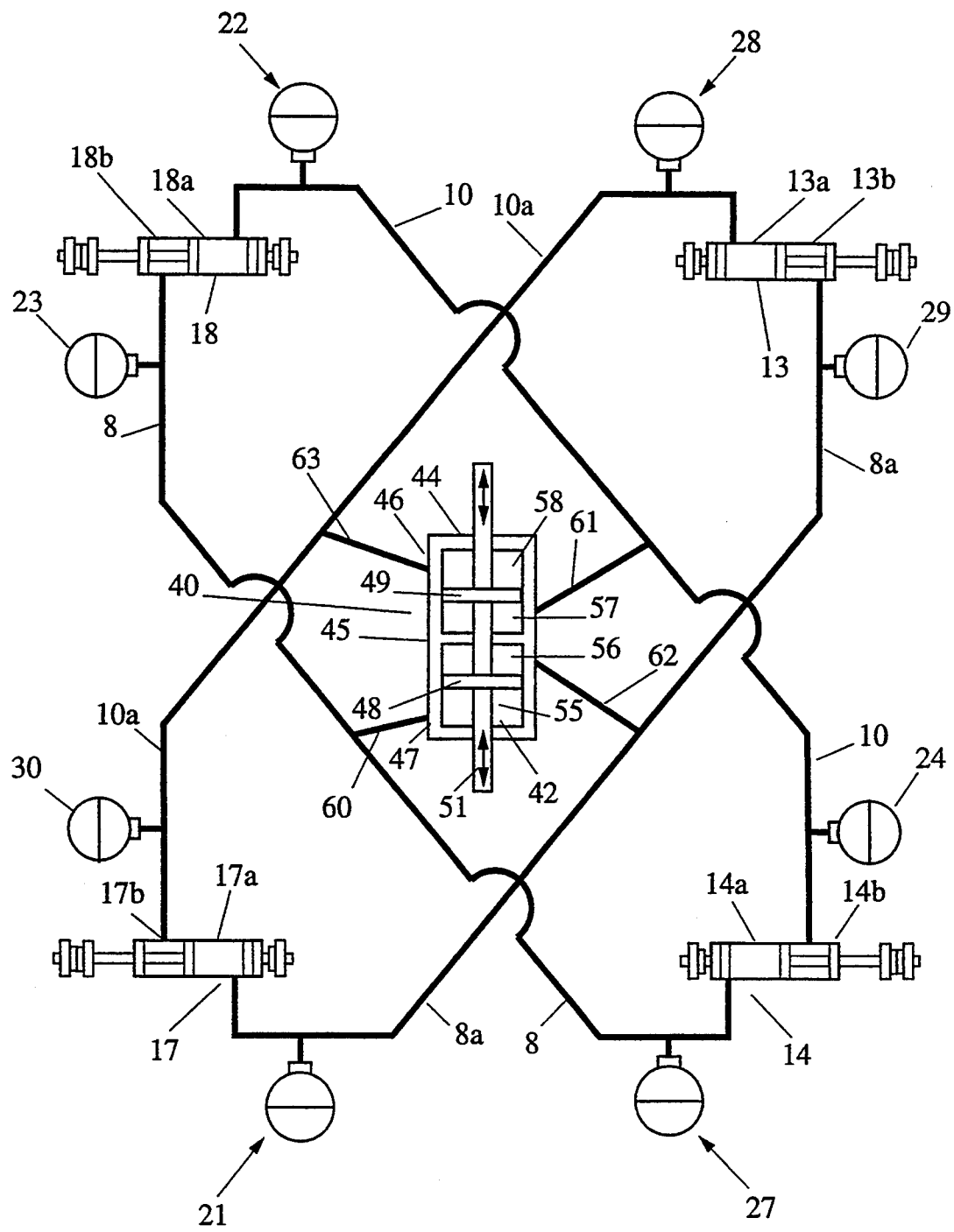
FIG. 2 is a fluid circuit diagram of a first modification of the suspension system shown in FIG. 1.

Referring now to FIGS. 1 and 2, the diagonally opposite rams 18 and 14 have the upper chamber 18a and lower chamber 14b in communication by the conduit 10 and lower chamber 18b and upper chamber 14a in communication by the conduit 8. Similarly the upper and lower chambers of the rams 17 and 13 are in communication, chambers 17a and 13b by the conduit 8a and chambers 17b and 13a by conduit 10a.

The conduits 8, 8a, 10 and 10a interconnecting the four double acting rams 13, 14, 17 and 18, which support the chassis 5, each has at least one pressure accumulator 27, 21, 22 and 28 in communication therewith, and are primarily responsible for providing resilience in the suspension as do springs in most prior art sprung suspensions. If the fluid used in the rams and connecting conduits is compressible, such as a gas, accumulators are not required as the resilient medium itself provides the required level of compressibility or resilience..It is preferred, as shown in FIG. 2 that additional optional accumulators, are provided, such as 23, 24, 29 and 30, in each of the conduits, 8, 10, and 8a 10a respectively. These accumulators, when provided are preferably smaller and matched in size and function to the lower chambers of the rams allowing the fluid in the lower chambers to be expelled quickly and provide resistance to shock loading when the wheels may be thrust down and could damage the pistons and their housings. The provision of accumulators in general also enable faster reactions and responses of ram movements as frictional losses are minimised.

All accumulators preferably are located as near as practical to their associated rams to provide an immediate and accurate response to fast dynamic forces arising when the vehicle is travelling fast.

When the above described suspension is fitted to normally slow moving vehicles, such as cranes, it is appropriate to incorporate only a single accumulator in each conduit and located near the first chamber of the ram connected by that conduit. In such vehicles the accumulators may be provided with an isolating means, such as a solenoid valve, to reduce the resilience of these particular circuits when under heavy lead. Additionally and conversely there can be multiple accumulators in any circuit and each accumulator may be precharged with gas to a different pressure to provide a progressive variety of spring rates to suit different loading situations.

The accumulators can each be provided with damping valve in the throat thereof to perform the same function as so called shock absorbers in other vehicles suspension systems.

Flow control devices such as indicated at 31, 32, 33 and 34 may be provided in any or each of the conduits reduce the rate of the fluid flow to ensure that the rams at either end of the conduits communicate directly only at a relatively slow speed, as arises when the vehicle is traversing rough ground requiring large wheel travel motions, and optimum low ground pressure on all wheels. At high speeds the small dynamic wheel travel motions are best resolved primarily by the accumulators.

Any of the conduits may be provided with flow control devices of a variable nature or other means to vary and even stop the flow along the conduits between the connected rams. An example of such a valve may be a solenoid valve controlled by an ECU which processes a variety of information from sources such as accelerometers or pressure transducers and thereby cause the sudden or gradual closure of the valves.

The above construction of the suspension system results in the movement of wheels 1 and 3, relative to the chassis 5, under the control of double acting rams 18 and 14, is in the same direction due to the arrangement of the interconnecting conduits 8 and 10. The movements are also approximately equal except for such difference as may arise from the fluid passed to the accumulator or accumulators coupled to the conduits 8 and 10. The same conditions exist in respect of the wheels 4 and 3.

The above interactions between the respective rams associated with each wheel of the vehicle effects control of roll when the vehicle is turning, particularly when turning at speed, and control of pitch when the vehicle is braking or acceleration, particularly severe braking or acceleration.

FIG. 2 illustrates a preferred modification of the suspension system as previously described with reference to FIGS. 1. The basic arrangement of the double acting rams 13, 14, 17 and 18 and the interconnecting conduits 8, 8a, 10 and 10a as described with reference to FIG. 1 is identical in the suspension system shown in FIG. 2. Accordingly, corresponding components in FIG. 2 are numbered identical to that used in FIGS. 1 and 2 and the construction and operations of the components will not be repeated.

The modification of the suspension system shown in FIG. 2 resides in the load distribution unit 40 with which each of the conduits 8, 8a, 10 and 10a are in direct independent communication. The load distribution unit comprises a body 41 having in the preferred form a cylindrical bore 42 closed at each end 43 and 44 and divided into two major chambers 46 and 47 by the intermediate fixed wall 45. Respective pistons 48 and 49 are provided in the chambers 46 and 47 each mounted on the piston rod 51 which extends in sealed relation through the intermediate wall 45 and each closed ends 43 and 44 of the body 41.

The pistons 48 and 49 and the piston rod 51 can move in the cylindrical bore 42 providing four variable volume minor chamber 55, 56, 57 and 58, with minor chambers 55 and 57 varying in the same direction in response to piston movement, and minor chambers 56 and 58 varying in the same direction but in the opposite direction to minor chamber 55 and 57 for the same piston movement. The conduits 8 and 10, forming the fluid circuit between diagonally opposite fluid rams 18 and 14, communicate with chamber 55 and 57 by branch conduits 60 and 61. Similarly conduits 8a and 10a, forming the fluid circuit between diagonally opposite rams 17 and 13, communicate with chambers 56 and 58 by branch conduits 62 and 63.

In the initial setting up of the suspension the fluid in the chambers 55, 56, 57 and 58 are adjusted so that the pistons 48 and 49 are each located substantially centrally in the respective major chambers 47 and 46. This initial setting up is carried out with the vehicle body 5 substantially horizontal or at the preferred operating attitude; and at the preferred operating height with respect to the wheels.

When operating the vehicle if the net pressure in minor chambers 55 and 57 is greater than the net pressure in minor chambers 56 and 58 a force will exist to effect displacement of the pistons 48 and 49 upwardly as seen in FIG. 2 to achieve a balance between the respective net pressures. This in turn will displace fluid from chambers 56 and 58 into the respective conduits 8a and 10a to bring about a balanced pressure in all of the double acting fluid rams 13, 14, 17 and 18 thereby achieving substantially uniform load distribution between all four wheels 1, 2, 3 and 4, independent of the respective position of each wheel relative to the chassis 5.

This pressure balance between the fluid in the respective circuits is particularly achieved when variation in wheel positions is relatively large as encountered in traversing terrain of substantial irregular surface, such as encountered in off-road vehicle operation, and where wheel movement is of relatively lower frequency but of substantial magnitude. In such operating conditions, it is most desirable to retain substantially even load distribution to all wheels in order to maintain traction and prevent bogging of the vehicle. Also in such conditions it is important to reduce lateral tilting of the vehicle to improve driver and passenger comfort, and safety from rolling over of the vehicle. The load distribution unit 40 operable as above discussed affects the necessary transfer of fluid to maintain substantial even load distribution between all four wheels and reduced chassis tilting movement.

Figure 3:
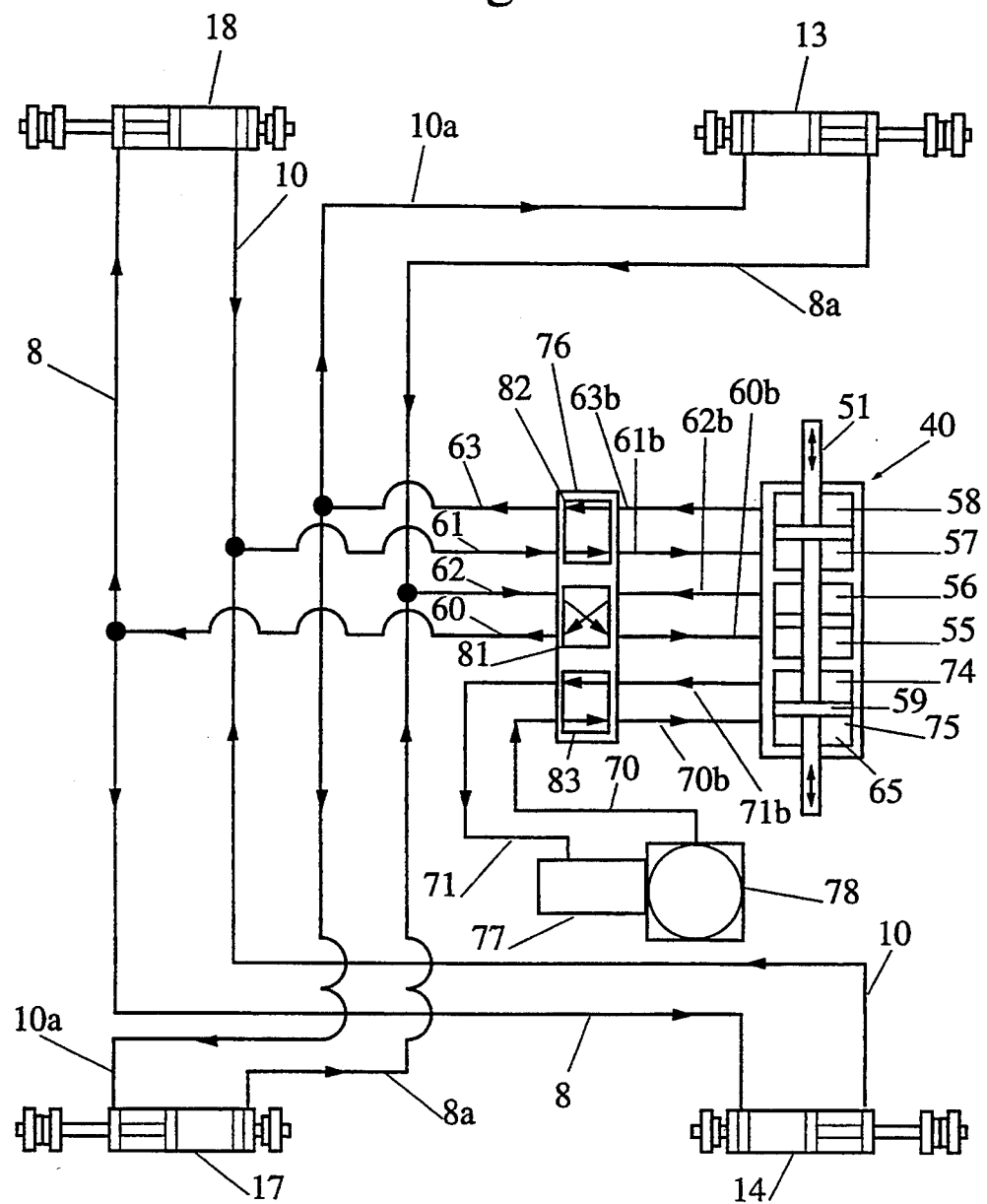
FIG. 3 is a fluid circuit diagram of a second modification of the suspension system.

FIG. 3 illustrates a preferred modification of the suspension system as previously described with reference to FIGS. 2. The basic arrangement of the double acting rams 13, 14, 17 and 18 and the interconnecting conduits 8, 8a , 10 and 10a as described with reference to FIGS. 1 and 2 is identical in the suspension system shown in FIG. 3. Accordingly, corresponding components in FIG. 3 are numbered identical to that used in FIGS. 1 and 2 and the construction and operations of the components will not be repeated.

Levelling of the Vehicle may be achieved by pumping up the vehicle's lower side while allowing fluid to drain to a reservoir from the high side. Alternatively levelling may be accomplished by either introducing or removing fluid from the circuits but by redistributing the fluid already within the circuits.

The modification of the suspension system shown in FIG. 3 resides in the interconnections between the load distribution unit 40 and the conduits 8, 8a, 10 and 10a, which incorporates the manifold 76 between branch conduits 60, 61, 62 and 63 and load distribution unit 41. The load distribution unit as described with reference to FIG. 2 includes the walls 42 and 44 and intermediate wall 45 forming major chambers 46 and 47 and pistons 48 and 49, mounted on the piston rod 51 which extends in sealed relation through the intermediate wall 45 and each closed ends 43 and 44 of the body 41. However the load distribution unit 40 as shown in FIG. 3 includes a further major chamber 65 through which the piston rod 51 also extends with the piston 59 mounted thereon.

The manifold 76 provides a respective straight through path for each of the branch conduits 60, 61, 62 and 63 to connect each to the respective chambers of the load distribution devices 40 by the conduits 60b, 61b, 62b and 63b. It is to be noted that conduit 60b and 62b are connected to the minor chambers 55 and 56 respectively and conduits 61b and 63b are connected to minor chambers 57 and 58. Incorporated in the manifold 76 are two change-over valves shown diagramatically at 81 and 82. The change-over valve 81 is operable in relation to conduits 61, 61b and 63, 63b, and valve 82 operable between conduits 60), 60b and 62, 62b. Each of the change-over valves 81 and 82 may be driver operated, or automatically operated in response to sensed vehicle operating conditions. The change-over valves may conveniently be solenoid operated.

By way of illustration the change-over valve 81 is shown in FIG. 3 is in the cross-over mode with conduit 60 communicating with conduit 62b and conduit 62 communicating with conduit 60b. Change-over valve 80 remains in the straight through mode with conduits 61 and 61b connected and conduits 63 and 63b connected.

The additional minor chambers 74 and 75 formed in the further major chamber 65 are connected via the manifold 76 and conduits 70, 70b and 71, 71b to the pump 78 and fluid reservoir 77 respectively, the latter being the fluid supply to the pump 78. The manifold 76 also incorporates a solenoid operated change-over valve at 83 which is operable to enable fluid to be pumped into either one of chambers 74 and 75 and to be returned from the other to the reservoir 77. Also the valve 83 is operable to short circuit conduits 70 and 71 and at the same time directly interconnect the minor chambers 74 and 75 whereby the piston 56 will not hinder the movement of the piston rod 51. The change-over valve 83 can also be driver operated or automatically operated.

While the vehicle is in normal passive use, load sharing by the wheels is accomplished by the redistribution of pressures and fluid volumes as previously described and therefore the solenoid valves within the manifold 76 remain in a position to allow the free passage of fluid to and from the associated load distribution unit 40 and the related circuits as previously described with reference to FIG. 2. During such periods of operation the change-over valve 83 is positioned so the chambers 74 and 75 are directly interconnected and isolated from the pump 78 and reservoir 77.

If, however, a load is introduced into, or removed from the vehicle causing one end or side to go up or down, then the change-over valves 81 and 82 can be actuated to cause a load levelling procedure to be initiated.

By way of example, it may be desired to lower the left side of the vehicle and raise the right side and this can be accomplished by causing the piston rod 51 to move upwardly as viewed in .FIG. 3 by delivering fluid to minor chamber 75 by the pump 78 while the change-over valve 82 is in the position as shown in FIG. 3 with conduits 60 and 62b connected, and conduits 60b and 62 connected. The vehicle can similarly be caused to roll in the opposite direction by moving the piston rod 51 downward as seen in FIG. 3 and pump fluid into minor chamber 74.

Similarly if the rear of the vehicle needs to be raised the solenoid valves within the manifold may only cross connect conduit 63 to 60b and 60 to 63b while the piston rod 51 is moved upwards.

In the embodiment shown in FIG. 3 the piston rod 51 can be moved by the selective admission of fluid to the minor chambers 74 and 75 from the pump 78 and this is convenient as the pump 78 can be a pump already incorporated in the vehicle such as a power steering pump. However, the piston rod 51 may be selectively moved by other means such as a solenoid thereby eliminating the need for the additional major chamber 65 and piston 56 together with the associated connections to the pump 78 and reservoir 77.

It will be appreciated that if required the levelling device described may be required to work at high speed to effect vehicular attitude changes while the vehicle is travelling at speed. When so operating it is preferable that the load distribution unit 40 and the associated change-over valves incorporated in the manifold 76 be controlled by electronic actuators governed by an ECU which monitors the vehicle operating conditions by appropriate sensors in this case it is normally preferable to separate the functions of load distribution and vehicle levelling these processes may occur concurrently without influencing one another.

While the accumulators described with reference to the various embodiments commonly incorporate damper valves the pneumatic version of the invention uses the volume of the chambers and connecting conduits as the resilient means itself, and the dampers normally incorporated in accumulators are therefore not available. It is therefore necessary to provide separate damper units in parallel with the rams. These may be of the common telescopic shock absorber variety and can be incorporated into the rams in a variety of ways.

The double acting ram may be of forms other than the rigid cylinder and moving piston type, and, for example, may be of the flexible bellows type which do not require seals as provided in the rigid cylinder type.

The bellow type being leak-free do not require provision to replace leaked fluid such as a pump, however when common double act rams are used it is optionally normal and beneficial to include a pump, compressor, accumulator or other power source to permit raising, levelling and attitude change or correction in the vehicle that may be necessary as a result of fluid leakage. Some vehicles may also require the facility of being able to run their vehicles at different and changeable heights. These variations are not illustrated or described in detail as such provisions in suspension systems are known and can easily be adapted or incorporated in the suspension system herein described.

It is to be understood that multiple axle vehicles can utilise variations of the suspension system disclosed therein and these are considered to be within the scope of the invention. Furthermore linked suspension systems which may comprise more than two circuits may usefully incorporate the technology described and therefore these variations are also included within the scope.

I claim:

1. A vehicle having a load support body, and a pair of front ground engaging wheels and a pair of rear ground engaging wheels connected to the body to support same and each wheel being displaceable relative to the body in a generally vertical direction, a double acting fluid ram interconnected between each wheel and the body, each ram including first and second fluid filled chambers varying in volume in response to relative vertical movement between the respective wheel and the body, each front wheel ram being connected to the diagonally opposite rear wheel ram by a respective pair of fluid communicating conduits, a first one of said pair of conduits connecting the first chamber of the front wheel ram to the second chamber of the rear wheel ram and the second one of said pair of conduits connecting the second chamber of the front wheel ram to the first chamber of the rear wheel ram, each pair of conduits and the front and rear wheel rams interconnected thereby constituting a respective closed circuit whereby first and second closed circuits are formed, and a pressure distribution device is interposed between the first and second closed circuits and adapted to substantially achieve pressure equilibrium in said closed circuits, and minimizing roll movement in a lateral direction and pitch movement in the longitudinal direction of the body.

2. A vehicle as claimed in claim 1 including means selectively operable to independently vary the volume or pressure of the fluid in each circuit to control the attitude of the vehicle body in the lateral and/or longitudinal direction.

3. A vehicle as claimed in claim 1 including valve means selectively operable to transfer fluid between the respective closed circuits to control the attitude of the vehicle body in the lateral and/or longitudinal direction.

4. A vehicle as claimed in claim 1 wherein said pressure distribution device comprises two closed chambers each divided into two minor chambers by a respective piston, said pistons being interconnected to move in unison in the respective closed chambers, the minor chambers on the same side of the respective pistons being connected respectively to the first and second conduits of one of said closed circuits and the minor chambers on the opposite side of the respective pistons being connected respectively to the first and second conduits of the other of said closed circuits, whereby in use the pistons will take up a position in the respective closed chambers to achieve pressure equilibrium in said two closed circuits.

5. A vehicle as claimed in claim 4 wherein valve means are provided to selectively communicate each conduit of the respective first and second circuits with a minor chamber on either side of the respective pistons to thereby control the attitude of the vehicle body in the lateral and/or longitudinal direction.

6. A vehicle as claimed in claim 4 or 5 including means to selectively displace said pistons in each closed chamber in unison to effect transfer of fluid between respective conduits within each circuit.

7. A vehicle as claimed in claim 1 wherein each circuit has at least one pressure accumulator in communication therewith.

8. A vehicle as claimed in claim 1 wherein each conduit of each circuit has a respective pressure accumulator in communication therewith.

9. A vehicle as claimed in claim 1 wherein each circuit has two pressure accumulators in communication therewith, one located in proximity to each fluid ram first chamber connected to the respective conduit.

10. A vehicle as claimed in claim 1 wherein at least one conduit has a flow control means therein to control the rate of flow of fluid in either direction there through.

11. A vehicle having a load support body, and a pair of front ground engaging wheels and a pair of rear ground engaging wheels connected to the body to support same and each wheel being displaceable relative to the body in a generally vertical direction, a double acting fluid ram interconnected between each wheel and the body to transfer the weight of the body and any load carried thereby to the wheels, each ram including first and second fluid filled chambers on opposite sides of a ram piston, said first and second chambers varying in volume in response to relative vertical movement between the respective wheel and the body, each front wheel ram being connected to the diagonally opposite rear wheel ram by a respective pair of fluid communicating conduits, a first one of said pair of conduits connecting the first chamber of the front wheel ram to the second chamber of the rear wheel ram and the second one of said pair of conduits connecting the second chamber of the front wheel ram to the first chamber of a rear wheel ram, each pair of conduits and the front and rear wheel rams interconnected thereby constituting a respective closed circuit whereby first and second closed circuits are formed, and a pressure distribution device is interposed between the first and second closed circuits and adapted to substantially achieve pressure equilibrium in said closed circuits, and each said closed circuit incorporating resilience to accommodate fluid displaced from rams in that circuit by a resultant pressure change.

12. A vehicle having a load support body, and a pair of front ground engaging wheels and a pair of rear ground engaging wheels connected to the body to support same and each wheel being displaceable relative to the body in a generally vertical direction, a double acting fluid ram interconnected between each wheel and the body, each ram including first and second fluid filled chambers on opposite sides of a ram piston, said first and second chambers varying in volume in response to relative vertical movement between the respective wheel and the body, each front wheel ram being connected to the diagonally opposite rear wheel ram by a respective pair of fluid communicating conduits, a first one of said pair of conduits connecting the first chamber of the front wheel ram to the second chamber of the rear wheel ram and the second one of said pair of conduits connecting the second chamber of the front wheel ram to the first chamber of the rear wheel ram, each pair of conduits and the front and rear wheel rams interconnected thereby constituting a respective closed circuit whereby first and second closed fluid circuits are formed, and a pressure balancing device is interposed between the first and second closed circuits and adapted to substantially equalize the pressure in said closed circuits, and each circuit incorporating resilience to accommodate fluid displaced from rams in that circuit by a resultant pressure change, each said circuit in operation being independent of external fluid and pressure sources.

13. A vehicle having a load support body, and a pair of front ground engaging wheels and a pair of rear ground engaging wheels connected to the body to support same and each wheel being displaceable relative to the body in a generally vertical direction, a double acting fluid ram interconnected between each wheel and the body to transfer the weight of the body and load carried thereby to the wheels, each ram including first and second fluid chambers on opposite sides of a ram piston, said first and second chambers varying in volume in response to relative movement between the respective wheel and the body, each front wheel ram being connected to the diagonally opposite rear wheel ram by a respective pair of fluid communicating conduits, a first one of said pair of conduits connecting the first chamber of the front wheel ram to the second chamber of the rear wheel ram and the second one of said pair of conduits connecting the second chamber of the front wheel ram to the first chamber of the rear wheel ram, each pair of conduits and the front and rear wheel rams interconnected thereby constituting a respective closed circuit whereby first and second closed fluid circuits are formed, and a pressure balancing device is interposed between the first and second closed circuits and adapted to substantially equalize to pressure in said closed circuits, and each said circuit incorporating resilience to accommodate fluid displaced from rams in that circuit by a resultant pressure change, and said closed circuits together minimizing roll movement in a lateral direction and pitch movement in the longitudinal direction of the body.

* * * * *